United States Patent
Haddon et al.

(10) Patent No.: US 6,622,155 B1
(45) Date of Patent: Sep. 16, 2003

(54) DISTRIBUTED MONITOR CONCURRENCY CONTROL

(75) Inventors: Bruce Kenneth Haddon, Boulder, CO (US); William Hayden Connor, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/198,477

(22) Filed: Nov. 24, 1998

(51) Int. Cl.$^7$ ................................................ G06F 9/00
(52) U.S. Cl. ...................... 709/100; 709/102; 709/108; 709/201
(58) Field of Search ................................ 709/106, 104, 709/100, 101, 102, 103, 105, 108, 201

(56) References Cited

U.S. PATENT DOCUMENTS

| | | |
|---|---|---|
| 4,814,971 A | 3/1989 | Thatte |
| 5,151,987 A | 9/1992 | Abraham et al. |
| 5,247,675 A | 9/1993 | Farrell et al. |
| 5,341,491 A | 8/1994 | Ramanujan |
| 5,469,562 A | 11/1995 | Saether |
| 5,481,706 A | 1/1996 | Peek |
| 5,524,247 A | 6/1996 | Mizuno |
| 5,590,326 A | 12/1996 | Manabe |
| 5,590,335 A | 12/1996 | Dubourreau et al. |
| 5,594,861 A | 1/1997 | Jönsson et al. |
| 5,636,376 A | 6/1997 | Chang |
| 5,666,533 A | 9/1997 | Horiguchi et al. |
| 5,675,798 A | 10/1997 | Chang |
| 5,706,515 A | 1/1998 | Connelly et al. |
| 6,389,446 B1 * | 5/2002 | Torii ........................ 709/100 |

FOREIGN PATENT DOCUMENTS

| | | |
|---|---|---|
| EP | 0 697 654 | 2/1996 |
| EP | 0 794 490 | 9/1997 |
| EP | 0 840 215 | 5/1998 |
| WO | 98/43193 | 10/1998 |

OTHER PUBLICATIONS

Gunther, Bernard K. "Mulithreading with Distributed Functional Units". IEEE Transactions on Computers, 1997.*
Samaras, George et al. "Context Management and Its Applications to Distributed Transactions", IEEE, 1996.*
International Search Report, Application No. PCT/US 99/27854, mailed May 11, 2000.

* cited by examiner

*Primary Examiner*—Majid Banankhah
(74) *Attorney, Agent, or Firm*—Robert C. Kowert; Meyertons, Hood, Kivlin, Kowert & Goetzel, P.C.

(57) ABSTRACT

A system and method is disclosed for synchronizing threads of execution within a distributed computing environment. Threads of execution within a computer spawn additional threads of execution on separate computers within the distributed computing environment. Each thread may compete for shared resources within the computing environment, thereby creating a need to avoid deadlocks among the local threads. Whereas locals thread exists within a single computing platform, logical threads are created to relate local threads to each other and thereby span the platforms on which the local threads reside. Distributed monitors are created to control access to shared resources by local threads based on logical thread affiliations. Locks within the distributed monitors are assigned to logical threads instead of local threads. Local threads that are each part of the same logical thread will all have access to the shared resource when the lock is assigned to the logical thread.

46 Claims, 3 Drawing Sheets

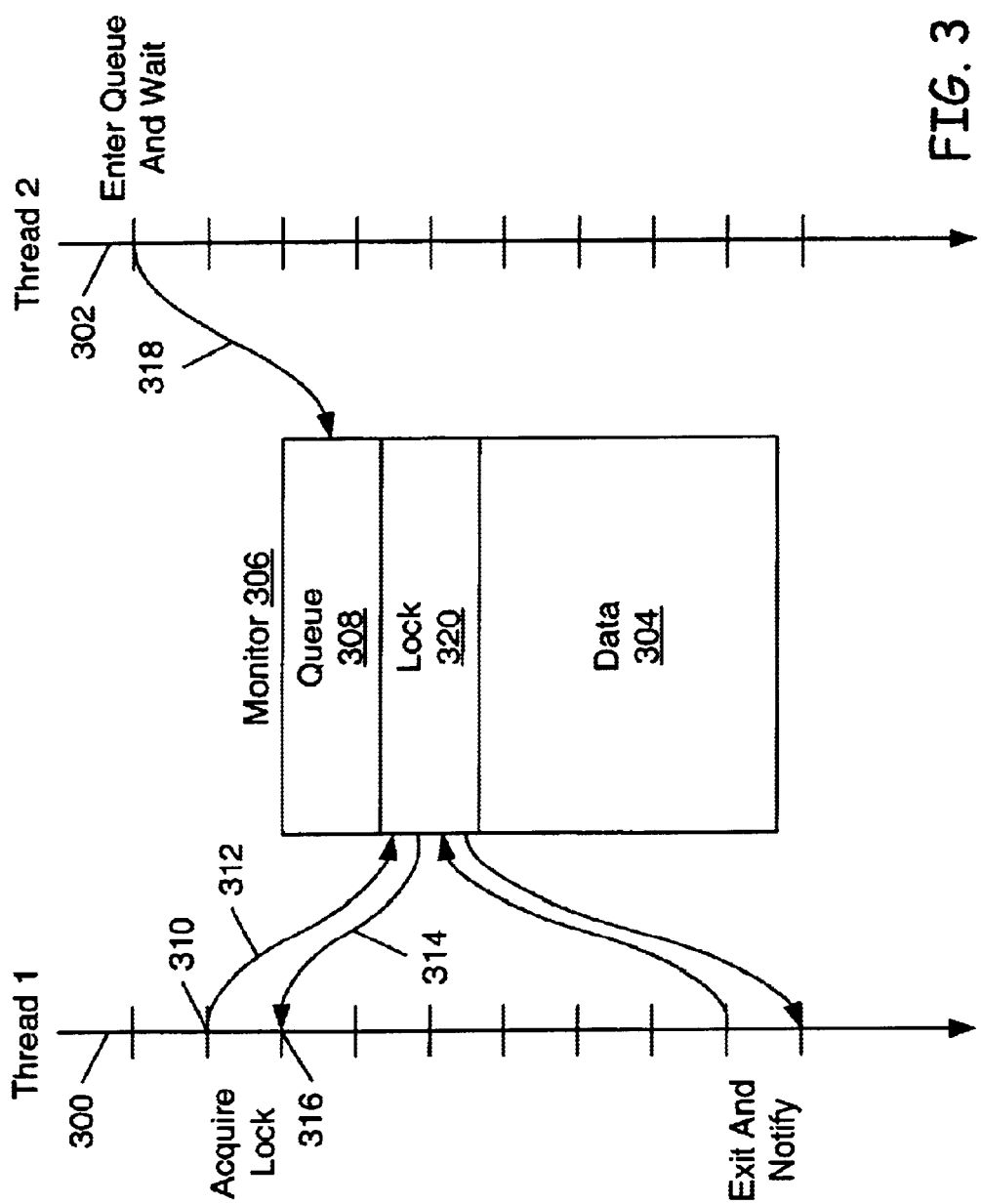

DISTRIBUTED MONITOR CONCURRENCY CONTROL

BACKGROUND OF THE INVENTION

1. Field of the Invention

The present invention relates to computer hardware and software, and more particularly to a system for thread synchronization in a distributed computing environment wherein multiple threads of execution span across different computing platforms.

2. Description of the Prior Art

The logical progression of executed steps in a microprocessor is called a "thread" of execution. Simple computer systems have a single microprocessor and an operating system that allows only one active thread of execution. Thus, software will execute in a serial fashion, with each operation running sequentially after the termination of the previous operation. This type of operating system becomes inefficient when system resources halt to allow a long calculation to finish executing.

For example, suppose that certain calculations were being performed on batches of data that were input by a data entry operator. In a system with a single thread of execution, the data entry operator would have to pause while each calculation was finished on the previous batch of data. It would be more efficient if the data entry operator could continuously input the data while calculations on the previous batch of data were executing in the background. Such a system would require multiple threads of execution: a first thread to process the input from the operator, and a second thread to perform the calculations on the previous batch of data.

In the example above, a multithreading scheme would be fairly simple to devise because it is unlikely that the first and second threads would interfere with each other. Each thread would execute on its own stack independently of the other. This is often called "unsynchronized" multithreading.

In a computer with a single microprocessor, unsynchronized multithreading may be accomplished by time-multiplexing the microprocessor. This means that the microprocessor, or CPU, divides its time between two or more stacks such that all stacks make some progress over time, without having the stacks explicitly call each other. The first stack would wait while execution proceeded on the second stack, and vice versa. As used herein, the term "concurrent threads" means that two or more threads are in various stages of execution concurrently. Concurrent threads may be executing one at a time in a time multiplexing scheme. Alternatively, a computer with parallel processors may have concurrent threads executing simultaneously.

There are a number of known techniques for time-multiplexing, including "preemptive" and "non-preemptive" multitasking. In a preemptive multitasking scheme, the operating system allocates time among the threads. In a non-preemptive scheme, the active thread controls the time at which it relinquishes execution.

In general, there is no assurance that multiple threads of execution can run concurrently without interfering with each other. For example, two threads of execution may access the same location in memory to store intermediate results. In this scenario, the first thread may store a value to memory, followed by the second thread over-writing a different value to the same location in memory. Thus, when the first thread retrieves the value it will corrupt the calculation in unpredictable ways. Resources that may be shared among concurrent threads, such as memory, must be protected in a manner that prevents corruption between the threads.

The process of assuring that concurrent threads do not interfere with each other is called "thread synchronization." Modern operating systems that allow multitasking operations have various tools to accomplish thread synchronization. Some examples include locks, monitors, and request servers.

Locks are relatively simple programming constructs that protect shared resources. A lock must be "acquired" by a thread of execution before that thread can access the shared resource. Prior to gaining control of the shared resource, the thread must show evidence that it has acquired the lock, or alternatively, the entire system must respect a convention in which threads without locks refrain from accessing the shared resource. In a simple system, the shared resource may only allow one lock to issue at any time, thus preventing any concurrent access to the resource.

Locks can be difficult to use in a layered or nested architecture because the lock evidence must be explicitly supplied to allow access to the shared resource. This presents a problem when a first thread acquires a lock, then waits for results from a second thread which also needs access to the same resource. This scenario can lead to a "deadlock" in which the first and second threads are each waiting for the other, as described in the following example:

Suppose a method or procedure called "foo( )" acquires a lock on resource "R." Subsequently, "foo( )" calls "goo( )" which also tries to acquire a lock on the resource R. The attempt by "goo( )" to acquire the lock will fail even though "goo( )" is operating on behalf of "foo( )." Thus, even when method "foo( )." has a lock, it can deadlock a system by calling a second method "goo( )" if both methods need the same resource R. A higher level concept, called a "monitor," provides a solution to this type of nesting problem.

Local "monitors" are a well known technique for thread synchronization. They are fairly easy to use and map well to object-oriented systems. In certain respects, a local monitor can be viewed as a programming construct in which a lock is assigned to a thread. In contrast, a simple lock (as described in the example above) is typically assigned to a shared resource. The local monitor is associated with the thread's section of code in which shared access is performed. Each local monitor comprises a queue and a lock. As a thread proceeds into a monitor, the thread will either be assigned a spot on the queue, or will be granted access to the resource while other threads wait on the queue. In this manner, a lock does not have to be passed from thread to thread.

Another technique for thread synchronization involves a "request server." A separate computing platform constitutes the request server, and clients to this server are the individual threads of execution. The server creates individual (local) threads of execution to handle each request from a client. Thus, the problems associated with distributed system concurrency control are reduced to a local problem of concurrency control where well known techniques can be applied. One of the drawbacks of this approach is the large overhead required to generate a new thread for each client request.

Several U.S. Patents are directed to the problem of thread synchronization. For example, U.S. Pat. No. 5,341,491 discloses an apparatus and method for ensuring that lock requests are serviced in a multiprocessor system. According to the disclosure, a lock queue includes a plurality of registers pipelined together, wherein lock requests only enter the lock queue if they are refused access to a shared resource a predetermined number of times.

U.S. Pat. Nos. 5,636,376 and 5,675,798 disclose a system and method for selectively and contemporaneously monitoring processes in a multiprocessing server. A status utility selectively accesses information to determine the status of the individual multiple processes executing on the server workstation. The information is of a granularity to identify processes which are hung up on semaphores, message queues, or the like.

U.S. Pat. No. 5,590,335 discloses a process for analysis of deadlocks in an operating system. The process includes the step of searching for any thread stopped on a lock, and further for the thread that holds that lock, and further up the chain until a cycle is found. In this manner, the user can reconstruct the cycle determining the deadlock.

U.S. Pat. No. 5,590,326 discloses a shard data management scheme using shared data locks for multi-threading. In this scheme, different shared data identifiers are assigned to different threads, and different locks are set up for different shared data identifiers, so as to enable the detection of an access in violation to the locks.

U.S. Pat. No. 5,524,247 discloses a system for scheduling programming units to a resource based on status variables indicating a lock or lock-wait state. The central processing unit (CPU) sets a predetermined value in the status variable corresponding to a thread when the thread starts waiting for a resource which it shares with other threads. The scheduler refers to the status variable, selects, with priority, a thread other than the thread waiting for the shared resource, and allocates the CPU to the thread thus selected.

U.S. Pat. No. 5,706,515 discloses a system for implementing an atomic wait for notification operations. A resource allocation subsystem includes an "initialization" procedure for initializing monitors, a "notify" procedure and a "wait" procedure. Each monitor has an associated event data structure denoting the status of the monitor as Signaled or Unsignaled. Each monitor also stores a value indicating how many threads are waiting on the monitor.

U.S. Pat. No. 5,247,675 discloses preemptive and non-preemptive scheduling and execution of program threads in a multitasking operating system. The operating system permits application programs to influence the schedule of execution of program threads. A priority level is assigned to each thread, and the highest priority thread is executed first.

U.S. Pat. No. 5,481,706 discloses a system and method for creating thread-safe shared libraries. The system insures correct functioning and integrity of the library functions accessible by multiple threads. A write-exclusive lock is used to protect shared resources.

Computer networks can allow different computing platforms to exchange data and to share network resources and peripheral devices. In simple computer networks, software will only execute within a single platform, although data may be accessed from various resources within the network. The issues surrounding thread synchronization typically remain local to each computing platform.

More recent developments in computer networking have enabled the execution of threads to progress across several different computing platforms. A "thread jump" occurs when a thread is executing on a first computing platform, and subsequently continues its execution on a second computing platform within the network. Networks of computing platforms that allow thread jumps are herein referred to a "distributed systems."

The problem of thread synchronization presents itself anew with distributed systems. The advent of thread jumps typically requires a method of thread synchronization that applies throughout the network. Prior synchronization systems are not normally applicable because they apply within the confines of a single computing platform. What has been desired, and is addressed by the by present invention is a system and method for thread synchronization that applies to distributed systems.

SUMMARY OF THE INVENTION

The present invention extends the applicability of monitors to distributed systems. An important element of the present invention is the "logical thread" which is comprised of one or more "local threads." While a local thread exists within a single computing platform, a logical thread may span several local threads, and thereby span the platforms on which the local threads reside. For example, in an object-oriented system, if an object on machine A makes a method call on an object on machine B, local threads on each machine (the calling thread and the called thread) belong to the same logical thread of execution. Thus, according to the present invention, monitors may be adapted to work with logical threads.

A mapping exists within each computing platform which maps local threads to logical threads. The mapping may be in the form of a hash table, or any other programming construct which associates local threads with logical threads. As new local threads are spawned by calls from other parts of the network, the new local threads are assigned to logical threads by the mapping construct.

Monitors within each platform are designed to function with logical threads instead of local threads. When a local thread enters a monitor, access to the shared resource is determined on the basis of the logical thread to which the local thread is affiliated. Thus, if the calling thread on a first machine has already gained access to a monitor, the called thread on a second machine will not be precluded from accessing the same resource.

BRIEF DESCRIPTION OF THE DRAWINGS

A more complete understanding of the present invention can be obtained by considering the following detailed description of the preferred embodiments thereof in conjunction with the accompanying drawings, in which:

FIG. 3 is a logic diagram representation of a monitor.

DETAILED DESCRIPTION OF THE INVENTION

Figure 1:
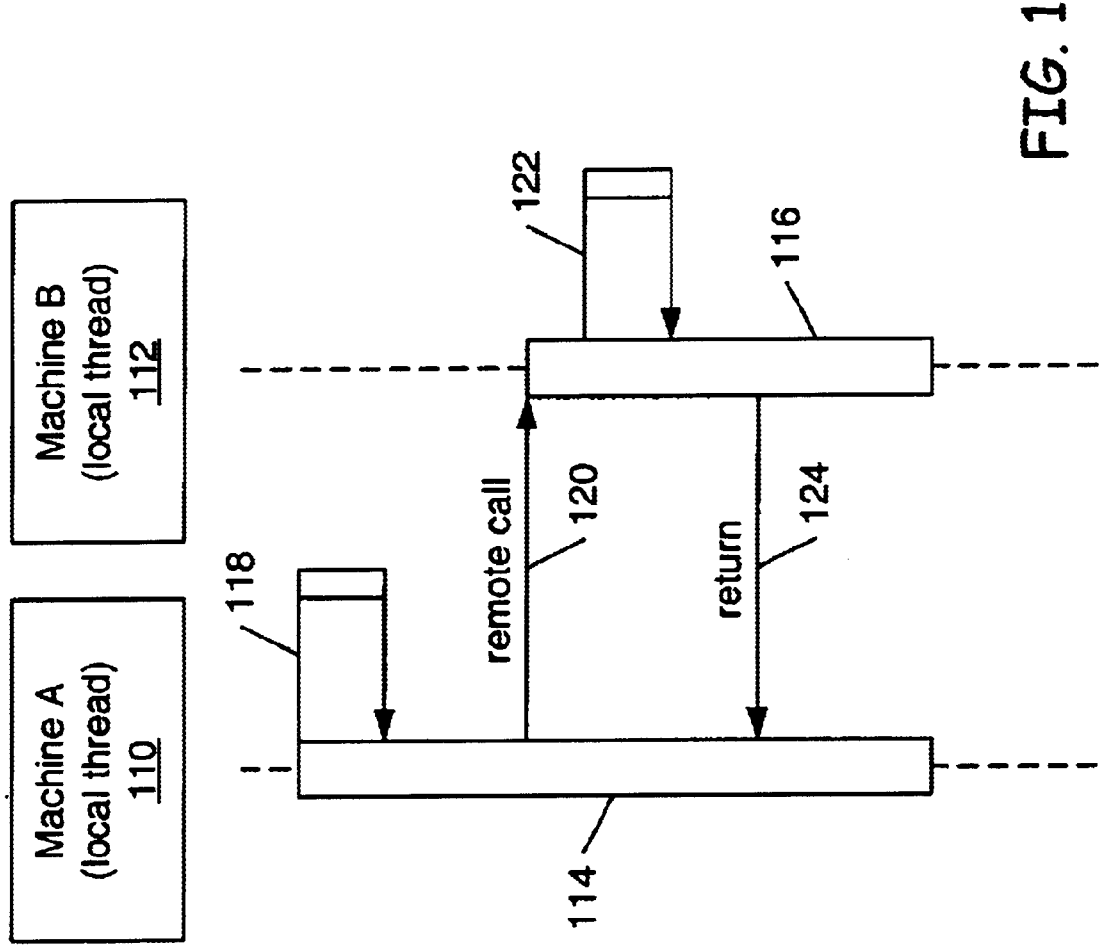
FIG. 1 is a logic diagram representation of two local threads on different computers that belong to the same logical thread.

Referring to FIG. 1, Block 110 is representative of a first computer (Machine A) within a distributed network. Block 112 is representative of a second computer (Machine B) which is also connected within the same distributed network as Block 110. Below each respective block is a bar representative of a local thread of execution within its respective machine. Thus, bar 114 is a local thread of execution within machine 110, and bar 116 is a local thread of execution within machine 112.

Each of the local threads of execution, 114 and 116, are shown schematically as proceeding stepwise from top to bottom in FIG. 1. Thus, local thread 114 proceeds in its stepwise execution starting from the top of bar 114, until it reaches line 118. Line 118 represents a local call from thread 114 that spawns another local thread within Machine A. The arrow-head on line 118 represents a "return" of local thread 118, at which point local thread 118 is terminated. Traditional thread synchronization schemes can be applied as long as local threads are spawned and returned within the same platform (Machine A).

A more complex scenario unfolds when local thread 114 is allowed to make a remote call to a second machine (Machine B) as shown by line 120. This type of remote call is a feature of new distributed computing environments. The remote call 120 spawns a new local thread on, Machine B shown by bar 116.

As between local threads 114 and 116, synchronization becomes problematic under prior technology if thread 116 tries to access a shared resource that has been locked by thread 114. A deadlock may occur because threads 114 and 116 will each wait for the other. The present invention solves this problem by associating the two local threads, 114 and 116, into a single "logical" thread. When thread 114 acquires a lock on a shared resource, the lock is held by the logical thread. Since local thread 116 is associated with the same logical thread, local thread 116 will be able to gain access to the shared resource and thereby avoid a deadlock. The mechanism for associating the lock with the logical thread is described below in connection with "monitors."

Local thread 116 can make local calls that spawn new threads within Machine B, as shown by line 122. Additionally, local thread 116 can make remote calls to other machines that are connected to the distributed computing environment, which will spawn new local threads within those machines. In each case, every new thread spawned from the original logical thread will become part of the same logical thread. Logical threads can thereby extend over an arbitrary number of platforms within a distributed computing environment.

Local threads, which are threads of execution within a single computing platform, are tied together to form logical threads. Remote method calls, from one computing platform to another, are one way in which more than one local thread can become tied together to form a logical thread. In some systems, event queuing and delivery could also tie multiple local threads to a single logical thread. "Thread jumps" result in tying local threads together to form logical threads.

According to the present invention, the series of local threads shown in FIG. 1 constitute a single logical thread. As logical threads span machines, they must be uniquely identifiable across all machines in the network and behave reasonably when one of the constituent local threads ceases to exists due to, for example, a machine halt. This behavior is particularly important when a logical thread is holding a lock on a monitor. If any one of the local threads ceases to exist, it is essential that the monitor lock be released in a timely manner to avoid locking out other access requests to the shared resource which the monitor controls. This problem is addressed, according to the present invention, with "reference counting" or "keep alive" mechanisms similar to "lease" type distributed garbage collectors.

A logical thread may be created, and stopped, according to the examples in the following code. The comments preceding the code describe the function of certain program elements. It will be understood by skilled programmers that various equivalent implementations exist, including different logical constructions of programming objects which, in aggregate, will perform the same function. The sample code is written for a JAVA Virtual Machine (JVM).

```
/** Start a logical thread. If the current local thread does
    not yet have
 * a logical thread, startLogicalThread( ) creates one and
   makes the
 * association. Calls to startLogicalThread( ) MUST be
   balanced by calls
 * to stopLogicalThread( ). Generally this is accomplished
   with try/finally
 * blocks.
 */
public static LogicalThread startLogicalThread( )
{
synchronized(mapping)
   {
   LogicalThread thread=getLogicalThread( );
   If (thread==null)
      SetLogicalThread( thread=new LogicalThread( );
   else
      thread.count++;
   return thread;
   }
}
/** Stop a logical thread. Calls to startLogicalThread( )
   MUST be balanced by calls
 * to stopLogicalThread( ). Generally this is accomplished
   with try/finally
 * blocks. When the last stopLogicalThread( ) is called
   (nesting depth is zero),
 * the logical thread thread/local thread association is
   removed and the logical thread
 * effectively no longer exists.
 */
public static void stopLogicalThread( );
{
synchronized(mapping)
   {
   LogicalThread thread=getLogicalThread( );
   if (thread==null ||thread.count==0)
      mapping.remove( Thread.currentThread( ));
   else
      thread.count-;
   }
}
```

Figure 2:
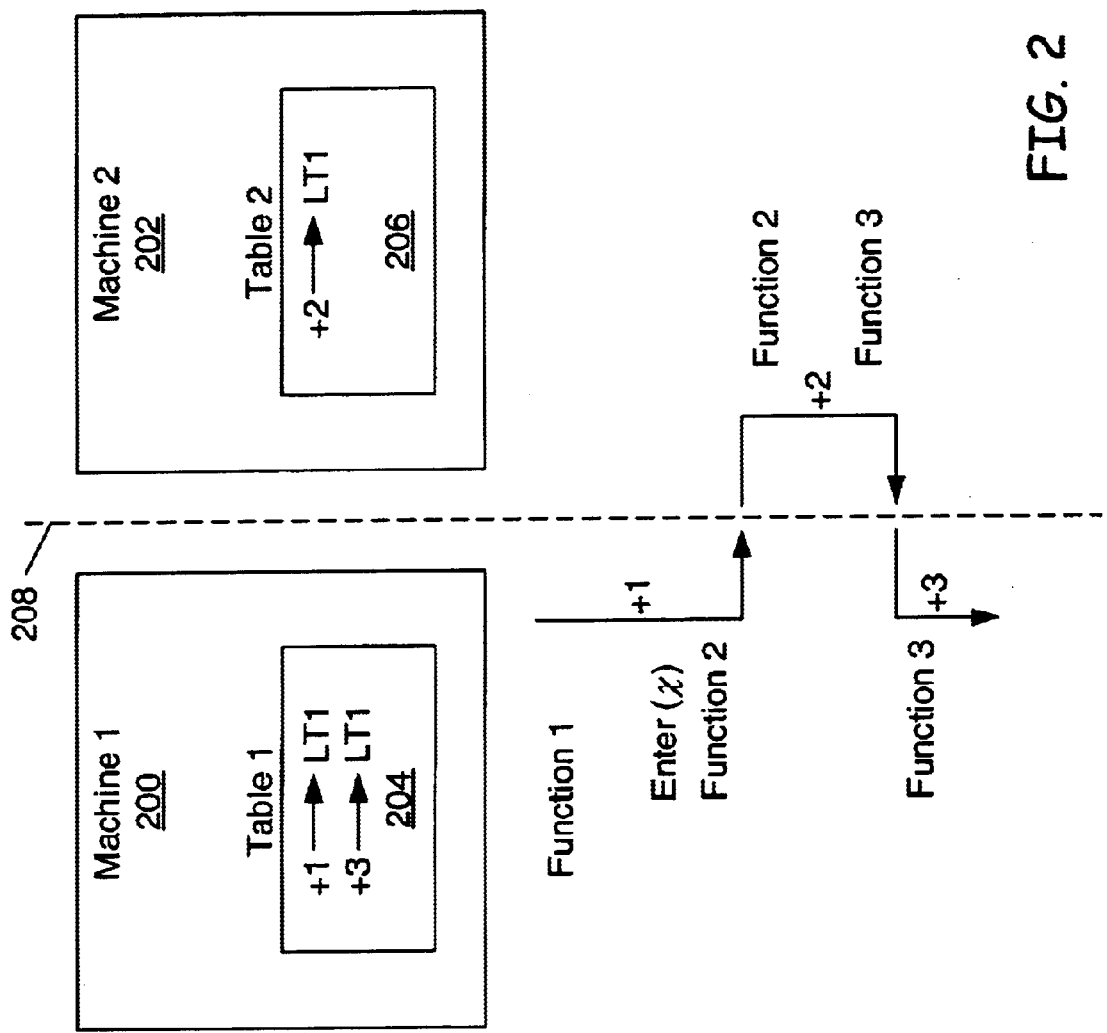
FIG. 2 is a logic diagram representation of local threads and logical threads according to the present invention, wherein logical thread 1 is comprised of several local threads.

Referring now to FIG. 2, two computers are shown as machine 1 (200) and machine 2 (202), which are connected in a distributed computing environment. Dashed line 208 in FIG. 2 represents a logical separation between computing platforms 200 and 202, which are still connected through a network. Local threads on each machine are shown as t1, t2, and t3, which comprise a single logical thread LT1. A table within each machine is updated at each thread jump to maintain current affiliations of local threads with logical threads.

A local thread, t1, is shown executing steps associated with function 1 in machine 1. Function 1 makes a call, "enter(x)" which is representative of a call to a monitor. Local thread t1 thus acquires a lock on a monitor. A thread jump occurs during execution of function 2, spawning a new local thread t2 within machine 2. A table within machine 1 (204) records the affiliation of local thread t1 with logical thread LT1. Similarly, a table within machine 2 (206) records the affiliation of local thread t2 with the same logical thread LT1. After a call to function 3, local thread t2 jumps back to machine 1, thus spawning a new local thread t3 on machine 1. The table within machine 1 (204) is updated accordingly to reflect that t3 belongs to LT1.

With each local thread, there is preferably associated a "thread context." The thread context is an identification assigned to local threads which is guaranteed to be unique among logical threads across all elements of the distributed system. When a thread jump occurs, the new local thread is given a thread context with the same identification as the thread from which the jump is being made. When a lock is acquired, the lock is tagged with that unique identification, thus ensuring the shared resource is locked for all the constituent local threads of the logical thread.

Whereas monitors typically operate with local threads, in a distributed monitor the locking function is associated with a logical thread. A distributed monitor preferable allows only a single logical thread to hold the lock at any one time. The logical thread that holds the lock can be identified through an Object Identifier (OID), which is one embodiment of the unique thread context. A mapping within each platform, for example tables 204 and 206, associate an OID with a distributed monitor. The mapping is preferably updated whenever the association changes.

The following sample code illustrates one way of mapping local threads to logical threads. The comments preceding the code describe the function of certain program elements. It will be understood by skilled programmers that various equivalent implementations exist, including different logical constructions of programming objects which, in aggregate, will perform the same function. The sample code is written for a JVM.

```
// Mapping of local/physical threads to LogicalThreads in
    this JVM
private static Hashtable mapping=new Hashtable ( );
/** Get the logical thread for the current local thread.
 * If a logical thread does not exist, getLogicalThread ( )
 * returns null. You start a logical thread by calling
 * LogicalThread.startLogicalThread( ) directly or implicitly
 * by calling LogicalThread.monitorEnter( ) or
     LogicalThreadmonitorLock( ).
 * A local thread may also be associated with a logical
     thread
 * by calling LogicalThread.setLogicalThread( ).
 * @return LogicalThread the logical thread associated
     with the current
 * local thread, or null if none.
 */
public static LogicalThread getLogicalThread( )
{
return      (LogicalThread)     mapping.get
    (Thread.currentThread( ));
}
/** Set the logical thread associated with the current local
    thread. May
 * be null to remove an association. SetLogicalThread( )
    replaces any
 * previous association, which is returned. You should
    generally restore
 * the previous association at an appropriate time
    (unrolling).
 * @logicalThread
 * @return LogicalThread
 */
public static LogicalThread setLogicalThread
    (LogicalThread logicalThread)
{
if (logicalThread==null)
    return (LogicalThread) mapping.remove
        (Thread.currentThread( ));
else
    return     (LogicalThread)     mapping.put
        (Thread.currentThread( ), logicalThread);
}
```

FIG. 3 represents the operation of a monitor. Within a single platform, monitors have long been used to synchronize threads. The present invention extends the use of monitors to distributed computing environments. A distributed monitor according to the present invention is designed to work with logical threads, instead of local threads.

Distributed monitors "belong" to objects, in the sense that the acquisition of a lock by an object is logically similar to "locking" the monitor.

Two concurrent threads are illustrated in FIG. 3. Each thread is local to a different computing platform: Thread 1 which is shown as line 300, and Thread 2 which is shown as line 302. The tick marks on each thread (300 and 302) represent steps in the execution of each respective thread. According to FIG. 3, Thread 1 proceeds with its steps of execution until it reaches a step 310 in which it must acquire access to certain data, shown diagrammatically as 304.

Since data 304 is a shared resource, it has a monitor 306 associated with it. The monitor 306 is comprised of a queue 308, a lock 320, and the data 304. It will be understood by practitioners that monitor 306, as shown in FIG. 3, is a highly stylized and simplified schematic that is used herein for purposes of illustration. More accurate representations of monitors may be found in reputable texts describing operating system architecture.

At step 310, Thread 1 "enters" the monitor. This action is shown schematically by the arrow 312 extending from step 310 to the monitor 306 in FIG. 3. In this example, there are no other threads waiting in the Queue 308 at the time that Thread 1 entered the monitor. Therefore, Thread 1 gains access to the lock 320, which functionally prevents other threads from accessing the data 304. The action of gaining access to the lock 320 is shown by arrow 314, which extends from the monitor 306 back to the next step in Thread 1, shown as step 316 along line 300.

Having gained access to the lock 320, Thread 1 proceeds through its steps of execution as shown schematically by successive tick marks along line 300. Thread 1 has access and control of the shared resource 304 which it uses to perform its calculations. In the example shown by FIG. 3, a second thread (labeled Thread 2 and shown schematically by line 302) attempts to gain access to the shared resource 304 while Thread 1 holds the lock 320. In the example illustrated by FIG. 3, Thread 2 is not part of the same logical thread as Thread 1. Therefore Thread 2 is forced to wait in a queue 308, as shown by the arrow labeled 318.

In the general case, the queue 308 may hold several threads which are each waiting to gain access to the shared resource 304. The monitor 306 may be designed to service the queue 308 with a first-in-first-out (FIFO) scheme. A more sophisticated monitor 306 may arrange priority in the queue 308 based on performance-enhancing criteria.

The following example code illustrates the acquisition of a lock on a monitor. Note that an "oid" stands for an "object identifier."

/** Acquire a distributed monitor lock on the given object. This

* is a balking version of monitorEnter( ). This call can fail if
* the object does not have 'Monitor.getMonitor( )' method (NoSuchMethodExeception)
* or if the object is remote and the remote call fails (RemoteException).
* Whether or not this call succeeds or fails, it must be balanced by a
* call to monitorExit( ).
* @param object Object whose monitor is to be used for locking
* @exception ObjectNotAvailableException a lock was not available for this object's
* monitor.
/*

```
public static void monitorLock(Object object)
    throws ObjectNotAvailableException
        LogicalThread                              thread=
    LogicalThread.startLogicalThread( );
    try
    {
    OID oid=(object instanceof Proxy) ? ((Proxy)object)
        .getOID( ):
        ObjectTable.put(object);
    // First one—acquire lock
    if (!thread.locks.contains (oid))
    {
        if(object instanceof Proxy)
    ((Proxy) object) .remoteMonitorLock_( );
        else
    Monitor.getMonitor(object) .monitorLock( );
        }
        thread.locks.addElement(oid);
    }
    catch(ObjectNotAvailableException e)// Stuff in some
        additional information
    {
        throw new ObjectNotAvailableException(object);
    }
}
```

Once an object has acquired a lock on a shared resource, it must eventually release the lock to allow other logical threads to gain access. The following code illustrates the process for releasing a lock from a logical thread.

/** Release a distributed monitor lock on the given object. This
* is a balking version of monitorEnter( ). This call can fail if
* the object does not have 'Monitor getMonitor( )' method (NoSuchMethodException)
* or if the object is remote and the remote call fails (RemoteException).
* @param object Object whose monitor is to be used for locking
*/

```
public static void monitorExit ( Object object)
{
    try
    {
    OID oid=(object instanceof Proxy)? ((Proxy)object)
        getOID( ):
        ObjectTable.put(object);
LogicalThread thread=getLogicalThread( );
    if( thread==null)
        throw new NoLogicalThreadError( );
// Last one-release lock
if(thread.locks.removeElement (oid) && !thread.locks
    .contains (oid))
{
    // The mechanics are such that the OID must still be in place when
    // we make the ((Proxy) object).remoteMonitorExit_( ) call since that
    //    vectors    directly    to    another
        LogicalThread.monitorExit( ) calls in
    // FactoryImpl. That second call will do nothing unless the OID is
    // present in the LogicalThread. Just make sure it gets removed-
    // hence the finally.
    thread.locks.addElement(oid);
    try
    {
        if(object instanceof Proxy)
    ((Proxy)object).remoteMonitorExit_( );
        else
    Monitor.getMonitor(object).monitorExit( );
    }
    finally
    {
        thread.locks.removeElement (oid);
    }
    }
    }
    finally
    {
        LogicalThread.stopLogicalThread( );
    }
}
```

It will be apparent to those of skill in the appertaining arts that various modifications can be made within the scope of the above invention. Accordingly, this invention is not to be considered limited to the specific examples or embodiments chosen for the purposes of disclosure, but rather to cover all changes and modifications which do not constitute departures from the permissible scope of the present invention. Having thus described our invention, what is desired to be secured and covered by Letter Patent is presented in the appended claims.

What is claimed is:

1. A method for synchronizing concurrent threads within a distributed computing network, said method comprising the steps of:
    (a) establishing a unique thread context for a first local thread on a first computer;
    (b) performing a thread jump from the first computer to a second computer to thereby spawn a second local thread on the second computer, wherein the first computer and the second computer are part of the distributed computing network;
    (c) transferring the unique thread context to the second local thread to thereby establish that the first local thread and the second local thread belong to the same logical thread.

2. The method according to claim 1, further comprising the steps of:
    (a) acquiring a lock on a distributed monitor using the first local thread;
    (b) associating the lock with the logical thread; and
    (c) gaining access to the distributed monitor with the second local thread.

3. The method according to claim 1, further comprising the steps of:
   (a) mapping, within the first computer, the first local thread to the logical thread; and
   (b) mapping, within the second computer, the second local thread to the logical thread.

4. The method according to claim 3, further comprising the step of updating each mapping within each computer whenever a new logical thread is created.

5. The method according to claim 3, further comprising the step of updating each mapping within each computer whenever a new logical thread is terminated.

6. The method according to claim 3, wherein the mapping is a table within each of the first and second computers, said table containing associations of local threads to logical threads.

7. The method according to claim 1, further comprising the step of creating a distributed monitor on shared resources.

8. A computing system for thread synchronization in a distributed computing environment, said system comprising:
   a first local thread resident on a first computer;
   a second local thread resident on a second computer, wherein said first computer and said second computer form at least part of said distributed computing environment;
   a logical thread comprised of said first local thread and said second local thread;
   a first mapping, stored within said first computer, associating said first local thread with said logical thread; and
   a second mapping, stored within said second computer, associating said second local thread with said logical thread.

9. The system according to claim 8, further comprising a distributed monitor configured to operate on the logical thread.

10. The system according to claim 9, wherein said distributed monitor is further configured to grant said second local thread access to a shared resource.

11. The system according to claim 8, wherein said first mapping is a table stored within said first computer, and wherein said second mapping is a table stored within said second computer.

12. A system for thread synchronization in a distributed computing environment, said system comprising:
   a first local thread resident on a first computer;
   a second local thread resident on a second computer, wherein said first computer and said second computer form at least part of said distributed computing environment;
   a logical thread comprised of at least said first local thread and said second local thread;
   a mapping within said first computer, said mapping associating said first local thread with said logical thread;
   a mapping within said second computer, said mapping associating said second local thread with said logical thread; and
   a distributed monitor within the distributed computing environment, comprised of (a) a queue, (b) a lock and (c) a shared resource, wherein said distributed monitor is configured to allow at least said first local thread and said second local thread to gain access to said shared resource whenever said logical thread has gained access to said lock.

13. A digital storage medium within a distributed computing environment, said digital storage medium configured to enable computer operations comprising:
   (a) executing a first local thread on a first computer
   (b) executing a second local thread on a second computer, said first computer and said second computer forming at least a portion of said distributed computing environment;
   (c) defining a logical thread comprised of said first local thread and said second local thread;
   (d) maintaining a mapping within said first computer to associate said first local thread with said logical thread;
   (e) maintaining a mapping within said second computer to associate said second local thread with said logical thread; and
   (f) using a distributed monitor with said logical thread to provide thread synchronization within said distributed computing environment.

14. A method, comprising:
   spawning a first local thread on a first computing platform in response to a remote call from a second local thread on a second computing platform;
   mapping the first local thread on the first computing platform to a first logical thread, wherein the first logical thread comprises the first local thread and the second local thread; and
   the first local thread attempting to access a shared resource, wherein access to the shared resource is granted to the first local thread if a lock for the shared resource is held by the first logical thread.

15. The method as recited in claim 14, further comprising:
   the first local thread spawning a third local thread on the first computing platform; and
   mapping the third local thread to the first logical thread.

16. The method as recited in claim 15, further comprising the third local thread attempting to access the shared resource, wherein access to the shared resource is granted to the third local thread if the lock for the shared resource is held by the first logical thread.

17. The method as recited in claim 14, further comprising:
   starting a fourth local thread on the first computing platform;
   mapping the fourth local thread to a second logical thread;
   the fourth local thread attempting to access the shared resource, wherein access to the shared resource is denied if the lock for the shared resource is held by the first logical thread.

18. The method as recited in claim 17, wherein in addition to the fourth local thread on the first computing platform, the second logical thread comprises one or more local threads on other computing platforms in a distributed computing environment.

19. A method for sharing a resource in a distributed computing environment, comprising:
   assigning a lock for a shared resource to a first logical thread, wherein the logical thread comprises local threads on a plurality of different computing platforms in the distributed computing environment;
   while the shared resource is assigned to the first logical thread:
      granting access to the shared resource for local threads belonging to the first logical thread; and
      denying access to the shared resource for local threads not belonging to the first logical thread.

20. The method as recited in claim 19, further comprising queuing access requests from local threads not belonging to the logical thread currently holding the lock for the shared resource.

21. A method, comprising:
for each of a plurality of computing platforms in a distributed computing environment, mapping one or more local threads to one or more logical threads, wherein each local thread is a thread executing on one of the computing platforms and each logical thread comprises related local threads from different ones of the computing platforms;
assigning a lock for a shared resource to one of the logical threads; and
granting access to the shared resource to local threads belonging to the logical thread currently holding the lock for the shared resource.

22. The method as recited in claim 21, wherein at least two of the local threads that are granted access to the shared resource while their logical thread holds the lock, are executing on different computing platforms in the distributed computing environment.

23. The method as recited in claim 21, further comprising queuing access requests for the shared resource from local threads belonging to logical threads not currently holding the lock.

24. The method as recited in claim 23, further comprising:
the logical thread currently holding the lock releasing the lock; and
granting the lock to the logical thread for the next queued request.

25. The method as recited in claim 21, further comprising:
a local thread on a first one of the computing platforms making a remote call to a second one of the computing platforms;
spawning a local thread on the second one of the computing platforms in response to the remote call; and
mapping the local thread spawned on the second one of the computing platforms to the same logical thread as the local thread on the first one of the computing platforms that made the remote call.

26. The method as recited in claim 21, wherein each logical thread is uniquely identified across the distributed computing platform.

27. A system, comprising:
means executing a first local thread on a first computing platform in response to a remote call from a second local thread on a second computing platform;
a map configured to associate the first local thread on the first computing platform with a first logical thread, wherein the first logical thread comprises the first local thread and the second local thread; and
a computing resource, wherein access to the computing resource is granted to the first local thread if a lock for the computing resource is held by the first logical thread.

28. The system as recited in claim 27, further comprising:
means for executing a third local thread on the first computing platform in response to a call from the first local thread; and
wherein said map is configured to associate the third local thread to the first logical thread.

29. The system as recited in claim 28, wherein access to the shared resource is granted to the third local thread if the lock for the shared resource is held by the first logical thread.

30. The system as recited in claim 27, further comprising:
means for starting a fourth local thread on the first computing platform;
wherein said map is configured to associate the fourth local thread to a second logical thread; and
wherein access to the shared resource is denied for the fourth local thread while the lock for the shared resource is held by the first logical thread.

31. The system as recited in claim 30, wherein in addition to the fourth local thread on the first computing platform, the second logical thread comprises one or more local threads on other computing platforms in a distributed computing environment.

32. A system, comprising:
a shared resource;
a monitor for the shared resource, wherein the monitor is configured to assign a lock to a logical thread comprising one or more local threads on one or more computing platforms in a distributed computing environment;
wherein the monitor is configured to grant access to the shared resource for local threads belonging to the logical thread currently assigned the lock; and
wherein the monitor is configured to deny access to the shared resource for local threads not belonging to the logical thread currently assigned the lock.

33. The system as recited in claim 32, further comprising a queue configured to hold one or more access requests from local threads not belonging to the logical thread currently assigned the lock for the shared resource.

34. A system, comprising:
a plurality of computing platforms in a distributed computing environment, wherein each computing platform is configured to map one or more local threads to one or more logical threads, wherein each local thread is a thread executing on one of the computing platforms and each logical thread comprises related local threads from different ones of the computing platforms;
a shared resource;
a monitor for the shared resource, wherein the monitor is configured to assign a lock to one of the logical threads; and
wherein access to the shared resource is granted to local threads belonging to the logical thread currently holding the lock for the shared resource.

35. The system as recited in claim 34, wherein at least two of the local threads that are granted access to the shared resource while their logical thread holds the lock, are executing on different computing platforms in the distributed computing environment.

36. The system as recited in claim 34, wherein the monitor comprises a queue configured to queue access requests for the shared resource from local threads belonging to logical threads not currently holding the lock.

37. The system as recited in claim 36, wherein the monitor is configured to grant the lock to the logical thread for the next queued request when the logical thread currently holding the lock releases the lock.

38. The system as recited in claim 34, wherein:
one of the computing platforms is configured to spawn a local thread in response to a remote call from another local thread on another one of the computing platforms; and
the one of the computing platforms on which the local thread is spawned is configured to map the spawned local thread to the same logical thread as the local thread on the one of the computing platforms that made the remote call.

39. The system as recited in claim 34, wherein each logical thread is uniquely identified across the distributed computing platform.

40. A digital storage medium configured to enable computer operations comprising:

spawning a first local thread on a first computing platform in response to a remote call from a second local thread on a second computing platform;

mapping the first local thread on the first computing platform to a first logical thread, wherein the first logical thread comprises the first local thread and the second local thread; and the first local thread attempting to access a shared resource, wherein access to the shared resource is granted to the first local thread if a lock for the shared resource is held by the first logical thread.

41. The digital storage medium as recited in claim 40, further configured to enable computer operations comprising:

the first local thread spawning a third local, thread on the first computing platform; and mapping the third local thread to the first logical thread.

42. The digital storage medium as recited in claim 41, further configured to enable computer operations comprising the third local thread attempting to access the shared resource, wherein access to the shared resource is granted to the third local thread if the lock for the shared resource is held by the first logical thread.

43. The digital storage medium as recited in claim 40, further configured to enable computer operations comprising:

starting a fourth local thread on the first computing platform;

mapping the fourth local thread to a second logical thread;

the fourth local thread attempting to access the shared resource, wherein access to the shared resource is denied if the lock for the shared resource is held by the first logical thread.

44. The digital storage medium as recited in claim 43, wherein in addition to the fourth local thread on the first computing platform, the second logical thread comprises one or more local threads on other computing platforms in a distributed computing environment.

45. A digital storage medium configured to enable computer operations comprising:

assigning a lock for a shared resource to a first logical thread, wherein the logical thread comprises local threads on a plurality of different computing platforms in the distributed computing environment;

while the shared resource is assigned to the first logical thread:
  granting access to the shared resource for local threads belonging to the first logical thread; and
  denying access to the shared resource for local threads not belonging to the first logical thread.

46. The digital storage medium as recited in claim 45, further configured to enable computer operations comprising queuing access requests from local threads not belonging to the logical thread currently holding the lock for the shared resource.

* * * * *

UNITED STATES PATENT AND TRADEMARK OFFICE
CERTIFICATE OF CORRECTION

PATENT NO.    : 6,622,155 B1
DATED         : September 16, 2003
INVENTOR(S)   : William Connor et al.

It is certified that error appears in the above-identified patent and that said Letters Patent is hereby corrected as shown below:

Column 14,
Line 18, please delete both instances of "one or more" and insert -- a plurality of -- in place thereof.

Signed and Sealed this

Eleventh Day of November, 2003

JAMES E. ROGAN
*Director of the United States Patent and Trademark Office*